United States Patent
Tanaka

(10) Patent No.: US 11,829,052 B2
(45) Date of Patent: Nov. 28, 2023

(54) GAZE DETECTION APPARATUS, GAZE DETECTION METHOD, AND NON-TRANSITORY COMPUTER READABLE MEDIUM

(71) Applicant: CANON KABUSHIKI KAISHA, Tokyo (JP)

(72) Inventor: Shu Tanaka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 83 days.

(21) Appl. No.: 17/552,808

(22) Filed: Dec. 16, 2021

(65) Prior Publication Data

US 2022/0197111 A1    Jun. 23, 2022

(30) Foreign Application Priority Data

Dec. 18, 2020    (JP) ................. 2020-210018

(51) Int. Cl.
*G03B 13/02*    (2021.01)
*G06F 3/01*    (2006.01)

(52) U.S. Cl.
CPC ............. *G03B 13/02* (2013.01); *G06F 3/013* (2013.01); *G03B 2213/025* (2013.01)

(58) Field of Classification Search
CPC .... G03B 2213/025; G06F 3/013; A61B 3/113
See application file for complete search history.

(56) References Cited

U.S. PATENT DOCUMENTS 7,206,022 B2 *  4/2007  Miller .................... H04N 23/50
                                                    348/333.03

FOREIGN PATENT DOCUMENTS

| JP | 07-289517 A | 11/1995 | |
| JP | 2004-008323 A | 1/2004 | |
| KR | 20140045873 A | * 4/2014 | ............. G06F 3/013 |

* cited by examiner

*Primary Examiner* — Christopher E Mahoney
(74) *Attorney, Agent, or Firm* — Cowan, Liebowitz & Latman, P.C.

(57) ABSTRACT

A gaze detection apparatus according to the present invention, includes at least one memory and at least one processor which function as: a detection unit configured to detect a gaze of an eye that views a display surface, based on an eye image obtained by capturing the eye; and a determination unit configured to determine whether the detection of the gaze is in error, based on a current eye image and a past eye image.

19 Claims, 14 Drawing Sheets

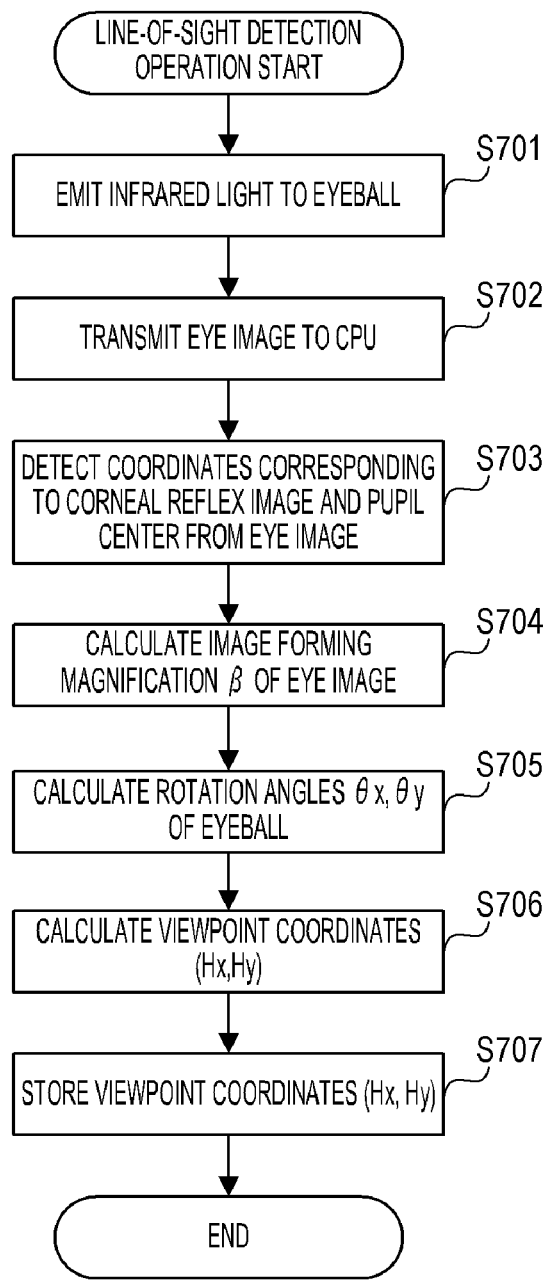

GAZE DETECTION APPARATUS, GAZE DETECTION METHOD, AND NON-TRANSITORY COMPUTER READABLE MEDIUM

BACKGROUND OF THE INVENTION

Field of the Invention

The present invention relates to a line-of-sight (gaze) detection apparatus, and an imaging apparatus equipped with the line-of-sight detection apparatus.

Description of the Related Art

Recently cameras are becoming more and more automated and intelligent. Japanese Patent Application Publication No. 2004-8323 discloses a technique that recognizes a user's intended object and performs focus control, based on information on a viewpoint (line-of-sight (gaze) position) of the user who looks into a finder without manually inputting the object position. Further, Japanese Patent Application Publication No. H07-289517 discloses a technique in which reliability of a line-of-sight detection result is determined using a captured eye image, and it is determined whether the line-of-sight detection can be performed or not based on the reliability. Then if it is determined that the line-of-sight detection cannot be performed, the cause of the line-of-sight detection impossibility is estimated.

In the technique disclosed in Japanese Patent Application Publication No. H07-289517, a single eye image is used for an error determination of the line-of-sight detection (determination on whether the detection of the line-of-sight is in error (failure); determination on whether the line-of-sight was accurately detected). In this method, however, an incorrect detection of the line-of-sight cannot be determined as an error at high accuracy. If the accuracy of the error determination is low, improper processing, based on an incorrectly detected line-of-sight, is performed at high frequency, for example. In a case of displaying an item at the detected viewpoint, the item is frequently displayed at a position that is different from the actual viewpoint (incorrectly detected viewpoint), and the display positions of the item disperse (item unstably moves) and the usability of the apparatus drops.

SUMMARY OF THE INVENTION

The present invention provides a technique that allows to perform an error determination of line-of-sight (gaze) detection at high accuracy.

The present invention in its first aspect provides a gaze detection apparatus including at least one memory and at least one processor which function as: a detection unit configured to detect a gaze of an eye that views a display surface, based on an eye image obtained by capturing the eye; and a determination unit configured to determine whether the detection of the gaze is in error, based on a current eye image and a past eye image.

The present invention in its second aspect provides a gaze detection method including: detecting a gaze of an eye that views a display surface, based on an eye image obtained by capturing an eye; and determining whether detection of the gaze is in error, based on a current eye image and a past eye image.

The present invention in its third aspect provides a non-transitory computer readable medium that stores a program, wherein the program causes a computer to execute a gaze detection method including: detecting a gaze of an eye that views a display surface, based on an eye image obtained by capturing an eye; and determining whether detection of the gaze is in error, based on a current eye image and a past eye image.

Further features of the present invention will become apparent from the following description of exemplary embodiments with reference to the attached drawings.

BRIEF DESCRIPTION OF THE DRAWINGS

FIG. 7 is a flow chart of the line-of-sight detection operation according to Embodiment 1;

DESCRIPTION OF THE EMBODIMENTS

Embodiment 1

Embodiment 1 of the present invention will be described with reference to the accompanying drawings.

Description on Configuration

Figure 1A:
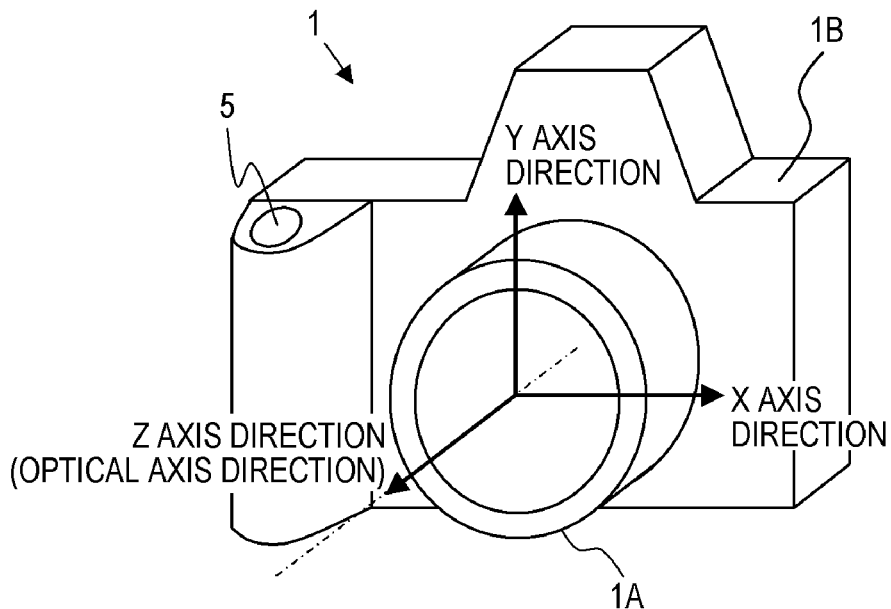
FIGS. 1A and 1B are external views of a camera according to Embodiment 1.
Figure 1B:
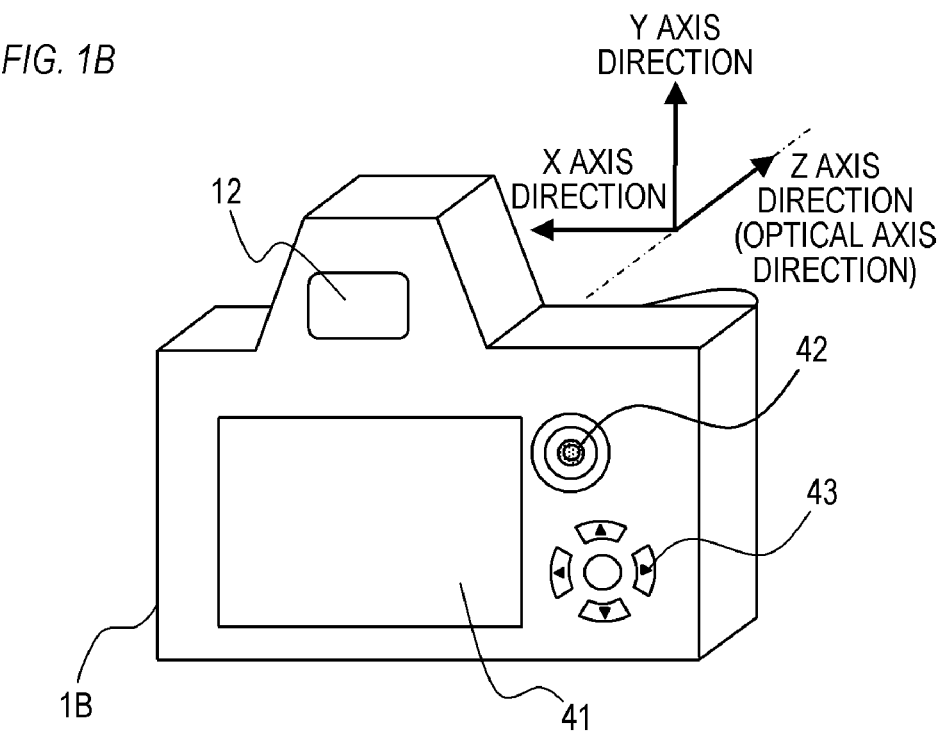

FIGS. 1A and 1B are external views of a camera 1 (digital still camera; lens interchangeable camera) according to Embodiment 1. FIG. 1A is a front perspective view and FIG. 1B is a rear perspective view. As illustrated in FIG. 1A, the camera 1 has a photographing lens unit 1A and a camera body 1B. A release button 5, which is an operation member to receive photographing operation from the user (photographer), is disposed on the camera body 1B. As illustrated in FIG. 1B, an eye piece 12 (eye piece optical system) for the user to look into a later mentioned display device 10 (display panel) included in the camera body 1B, is disposed on the rear face of the camera body 1B. The eye piece optical system may include a plurality of lenses. Operation members 41 to 43, to receive various operations from the user, are also disposed on the rear face of the camera body 1B. For example, the operation member 41 is a touch panel to receive touch operation, the operation member 42 is an operation lever that can be pushed down in each direction, and the operation member 43 is a four-direction key which can be pushed down in each of the four directions. The operation member 41 (touch panel) includes a display panel (e.g. liquid crystal panel), and has a function to display an image on the display panel.

Figure 2:
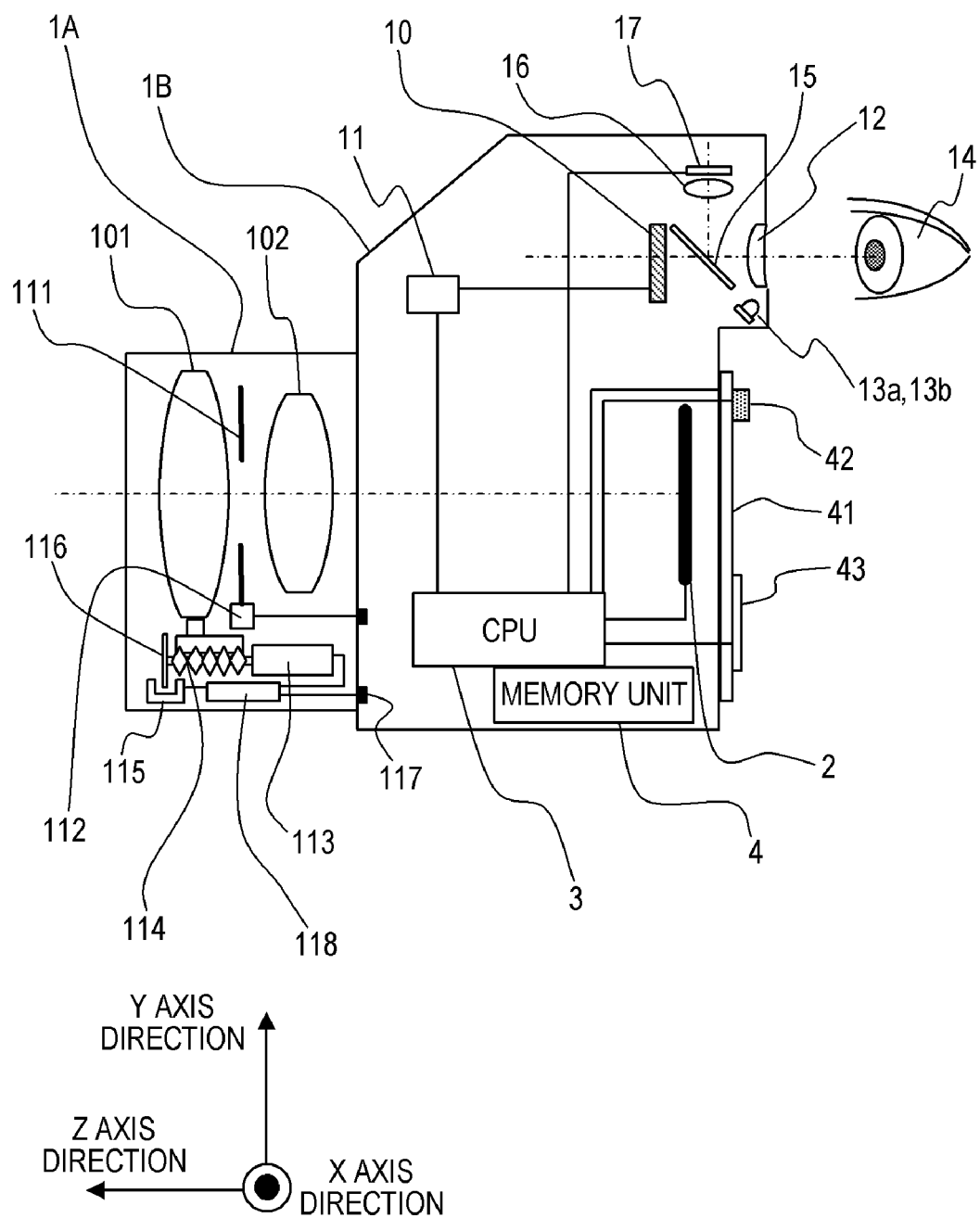
FIG. 2 is a cross-sectional view of the camera according to Embodiment 1.

FIG. 2 is a cross-sectional view when the camera 1 is sectioned by the YZ plane formed by the Y axis and the Z axis indicated in FIG. 1A, and depicts a general internal configuration of the camera 1.

The photographing lens unit 1A encloses two lenses 101 and 102, an aperture 111, an aperture-driving unit 112, a lens-driving motor 113, a lens-driving member 114, a photocoupler 115, a pulse plate 116, a mount contact 117, a focus adjustment circuit 118, and the like. The lens-driving member 114 is constituted of a driving gear and the like, and the photocoupler 115 detects a rotation of the pulse plate 116 interlocking with the lens-driving member 114, and transfers the rotation to the focus adjustment circuit 118. The focus adjustment circuit 118 drives the lens-driving motor 113 based on the information from the photocoupler 115 and the information from the camera body 1B (information on the lens driving amount), and changes the focus position by moving the lens 101. The mount contact 117 is an interface between the photographing lens unit 1A and the camera body 1B. The two lenses 101 and 102 are illustrated for simplicity, but the photographing lens unit 1A actually includes more than two lenses.

The camera body 1B encloses an image pickup element 2, a CPU 3, a memory unit 4, a display device 10, a display device-driving circuit 11, and the like. The image pickup element 2 is disposed on a projected imaging plane of the photographing lens unit 1A. The CPU 3 is a control processing unit of the microcomputer, and controls the camera 1 in general. The memory unit 4 stores images and the like captured by the image pickup element 2. The display device 10 is constituted of liquid crystals, or the like, and displays the captured image (object image), or the like, on the display surface of the display device 10. The display device-driving circuit 11 drives the display device 10. The user can view the display surface of the display device 10 through the eye piece 12.

The camera body 1B also encloses light source 13a and 13b, a light divider 15, a light-receiving lens 16, an eye image pickup element 17, and the like. The light sources 13a and 13b are light sources that have been used for single-lens reflex cameras to detect the line-of-sight (gaze) direction based on the relationship between a reflex image formed by the corneal reflex of the light (corneal reflex image; Purkinje image) and a pupil, and are light sources to illuminate an eyeball 14 of the user. Specifically, the light sources 13a and 13b are infrared light-emitting diodes, for example, which emit infrared light unsensed by the user, and are disposed around the eye piece 12. An optical image of the illuminated eyeball 14 (eyeball image: image formed by the reflected light, which was emitted from the light sources 13a and 13b and reflected by the eyeball 14) transits through the eye piece 12, and is reflected by the light divider 15. Then using the light-receiving lens 16, the eyeball image is formed on the eye image pickup element 17, where photoelectric element rows of CMOSs or the like are disposed two-dimensionally. The light-receiving lens 16 is positioned so that the pupil of the eyeball 14 and the eye image pickup element 17 are in a conjugate image forming relationship. By a predetermined algorithm, which will be described later, the line-of-sight direction of the eyeball 14 (viewpoint (line-of-sight position) on the display surface of the display device 10) is detected from the position of the corneal reflex image in the eyeball image formed on the eye image pickup element 17.

Figure 3:
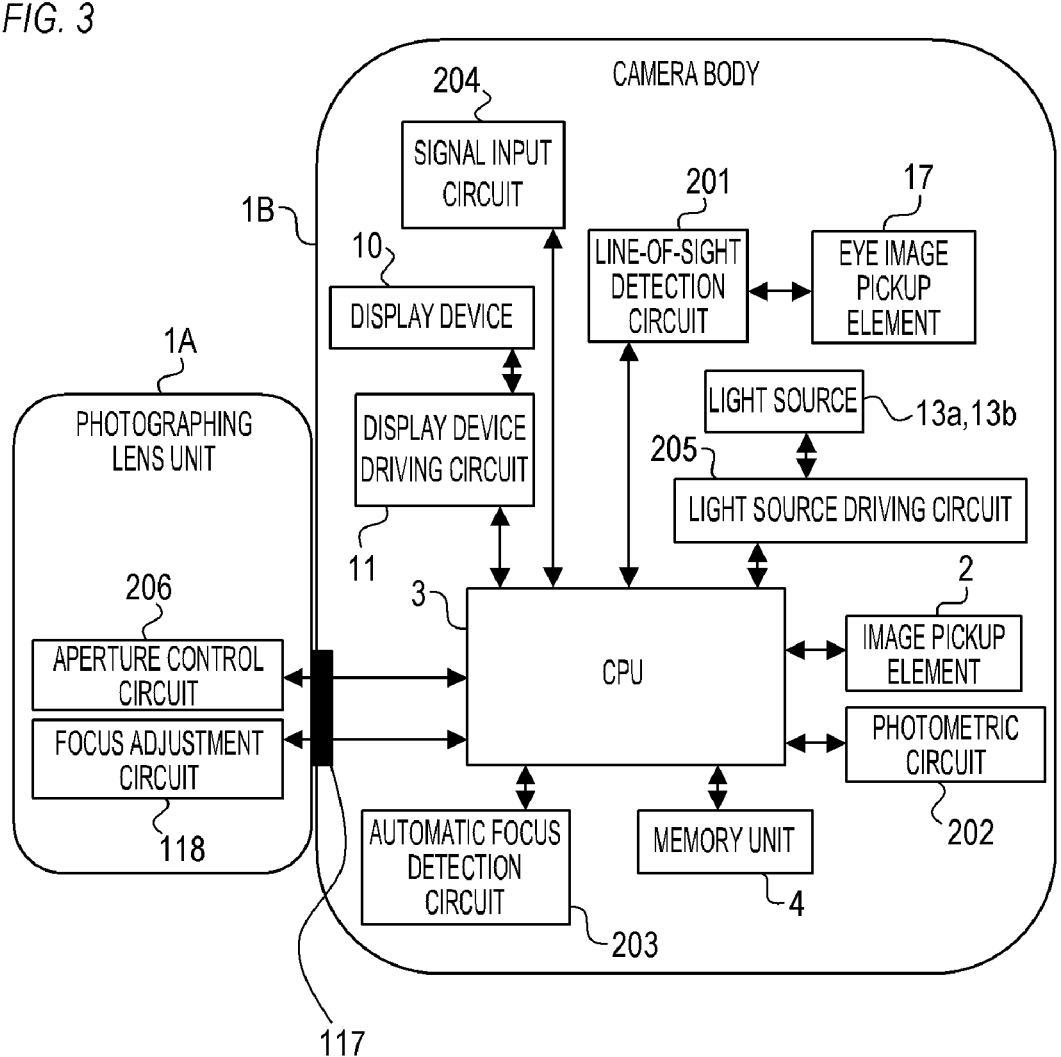
FIG. 3 is a block diagram of the camera according to Embodiment 1.

FIG. 3 is a block diagram depicting an electric configuration inside the camera 1. A line-of-sight detection circuit 201, a photometric circuit 202, an automatic focus detection circuit 203, a signal input circuit 204, the display device-driving circuit 11, a light source-driving circuit 205, and the like, are connected to the CPU 3. Further, the CPU 3 transfers signals to the focus adjustment circuit 118 disposed in the photographing lens unit 1A, and to an aperture control circuit 206 included in the aperture-driving unit 112 inside the photographing lens unit 1A via the mount contact 117. The memory unit 4 attached to the CPU 3 has a function to store imaging signals from the image pickup element 2 and the eye image pickup element 17 and a function to store line-of-sight correction parameters to correct the differences of the lines-of-sight depending on the individual, which will be described later.

The line-of-sight detection circuit 201 performs A/D conversion on the output of the eye image pickup element 17 (eye image that captured an eye) in the state where an eyeball image is formed on the eye image pickup element 17, and sends the result to the CPU 3. The CPU 3 extracts the characteristic points required for the line-of-sight detection from the eye image according to a predetermined algorithm (described later), and calculates the line-of-sight of the user (viewpoint on the display surface of the display device 10) from the positions of the characteristic points.

The photometric circuit 202 performs amplification, logarithmic compression, A/D conversion, and the like, on a signal (specifically, a brightness signal corresponding to the brightness of a field) acquired from the image pickup element 2 which also plays a role of a photometric sensor, and sends the result to the CPU 3 as field brightness information.

The automatic focus detection circuit 203 performs A/D conversion on the signal voltages from a plurality of detection elements (a plurality of pixels) used for phase difference detection, included in the image pickup element 2, and sends the result to the CPU 3. The CPU 3 calculates the distance to an object corresponding to each focus detection point based on the signals of the plurality of detection elements. This is a technique known as the "imaging plane phase difference AF". In Embodiment 1, it is assumed, for example, that the focus detection point is at each of the 180 points on the imaging plane corresponding to the 180 points indicated in the visual field image inside the finder (display surface of the display device 10) illustrated in FIG. 4A.

A switch SW1, which turns ON at the first stroke of the release button 5 to start photometry, distance measurement, line-of-sight detection operation, or the like, of the camera 1, and a switch SW2, which turns ON at the second stroke of the release button 5 to start photography operation, are connected to the signal input circuit 204. The ON signal from the switch SW1 or SW2 is inputted to the signal input circuit 204 and is sent to the CPU 3.

Figure 4A:
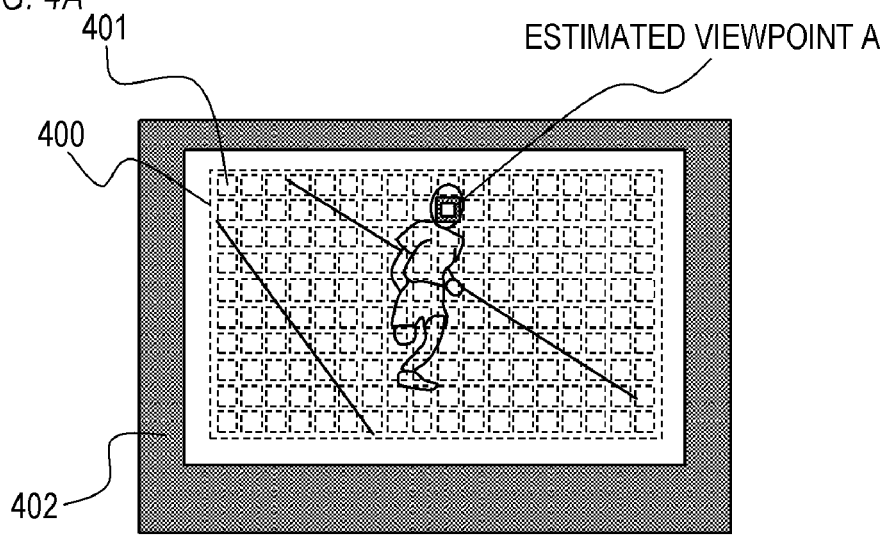
FIGS. 4A to 4C are diagrams depicting a visual field inside a finder according to Embodiment 1.

FIG. 4A is a diagram depicting a visual field inside the finder, and indicates a state where the display device 10 is operating (a state where an image is displayed). As illustrated in FIG. 4A, the visual field inside the finder includes a focus detection region 400, 180 distance-measuring point indices 401, a visual field mask 402, and the like. Each of the 180 distance-measuring point indices 401 is disposed on the imaging plane superimposed on a through image (live view image) displayed on the display device 10, so as to be displayed at a position corresponding to the focus detection point. A distance-measuring point index 401 corresponding to the current viewpoint A (estimated position), out of the 180 distance-measuring point indices 401, is displayed emphasized by a frame, or the like.

Description on Line-of-Sight Detection Operation

Figure 5:
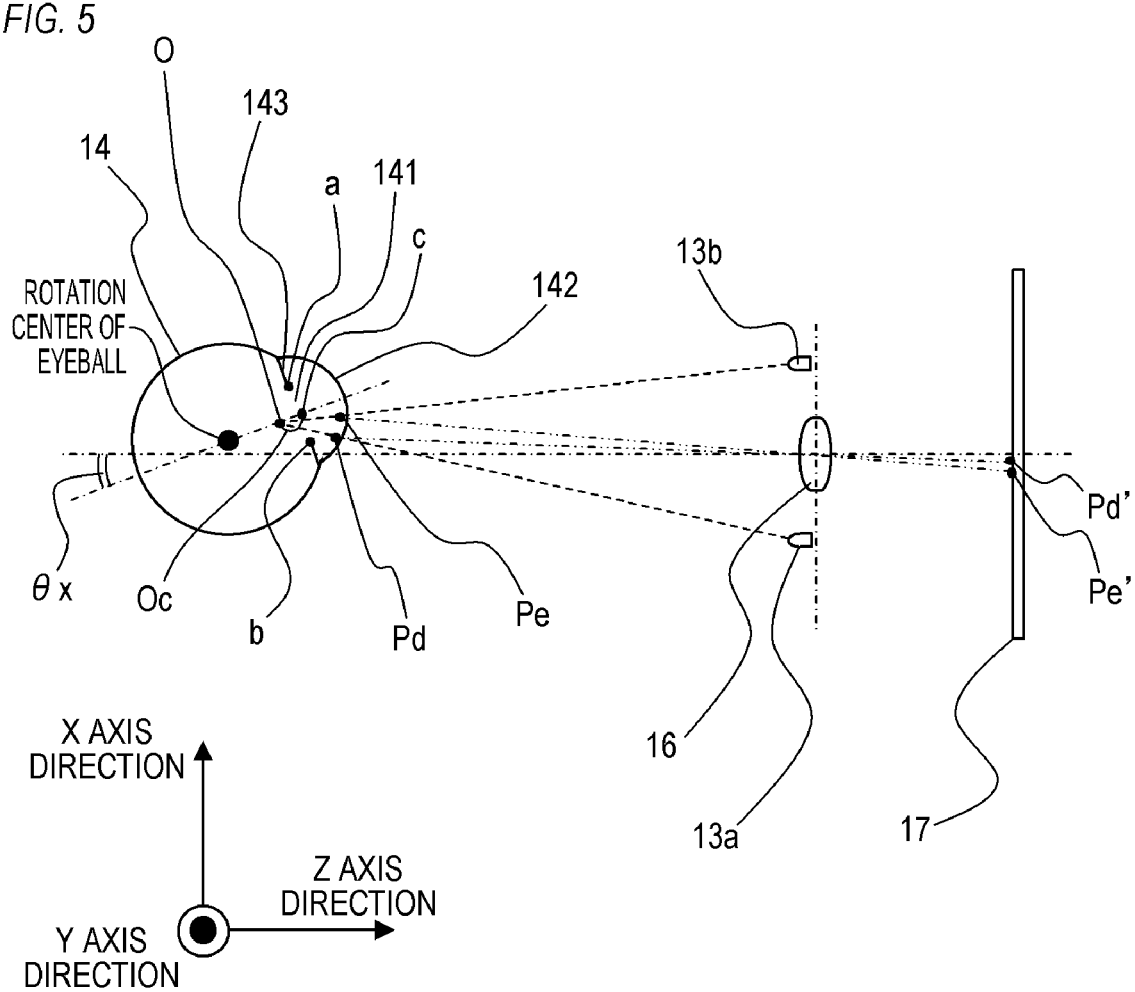
FIG. 5 is a diagram for describing a principle of a line-of-sight (gaze) detection method according to Embodiment 1.
Figure 6A:
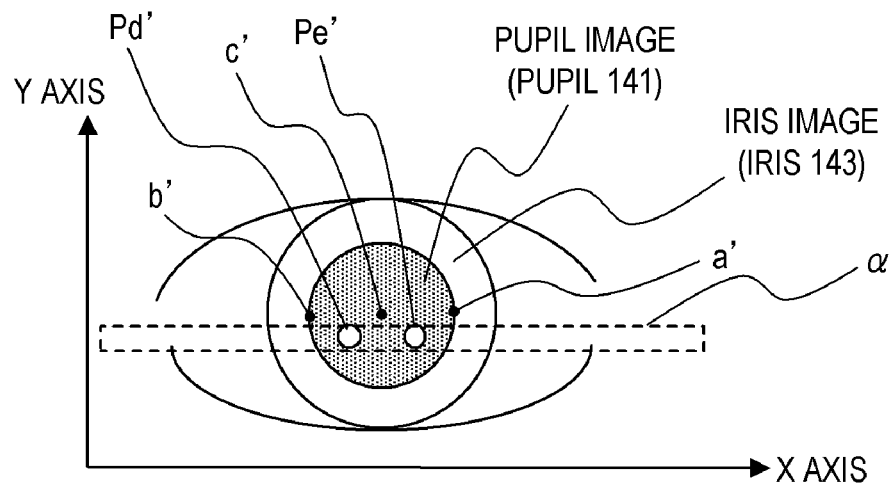
FIG. 6A is a diagram depicting an eye image according to Embodiment 1.
Figure 6B:
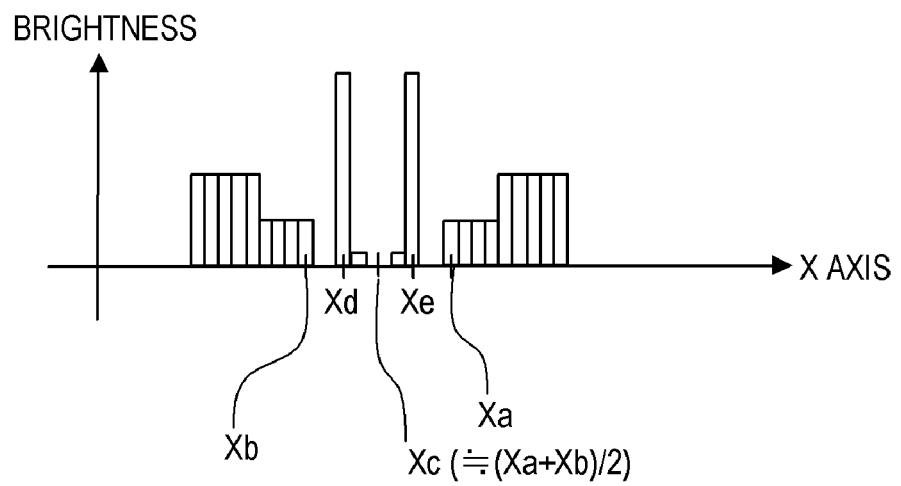
FIG. 6B is a graph indicating a brightness distribution of the eye image according to Embodiment 1.

A line-of-sight detection method will be described with reference to FIGS. 5, 6A, 6B and 7. FIG. 5 is a diagram for describing a principle of the line-of-sight method, and is a schematic diagram of an optical system used for the line-of-sight detection. As illustrated in FIG. 5, the light sources 13a and 13b are disposed approximately symmetrical with respect to the optical axis of the light-receiving lens 16, and illuminate the eyeball 14 of the user. A part of the light, which is emitted from the light sources 13a and 13b and is reflected by the eyeball 14, is collected at the eye image pickup element 17 by the light-receiving lens 16. FIG. 6A is a schematic diagram depicting an eye image (eyeball image projected onto the eye image pickup element 17) captured by the eye image pickup element 17, and FIG. 6B is a graph indicating an output intensity of a CMOS in the eye image pickup element 17. FIG. 7 is a general flow chart of the line-of-sight detection operation.

When the line-of-sight detection operation starts, in step S701 in FIG. 7, the light sources 13a and 13b emit infrared light toward the eyeball 14 of the user. An image of the eyeball of the user, illuminated by infrared light, is formed on the eye image pickup element 17 via the light-receiving lens 16, and is photoelectrically converted by the eye image pickup element 17. Thereby a processable electric signal of the eye image can be acquired.

In step S702, the line-of-sight detection circuit 201 sends the eye image (eye image signal: electric signal of the eye image) acquired from the eye image pickup element 17, to the CPU 3.

In step S703, the CPU 3 determines the coordinates of the points corresponding to the corneal reflex images Pd and Pe of the light sources 13a and 13b, and a point corresponding to the pupil center c, from the eye image acquired in step S702.

The infrared lights emitted from the light sources 13a and 13b illuminate the cornea 142 of the eyeball 14 of the user. At this time, the corneal reflex images Pd and Pe, formed by a part of the infrared lights reflected on the surface of the cornea 142, are collected by the light-receiving lens 16, form images on the eye image pickup element 17, and become the corneal reflex images Pd' and Pe' on the eye image. In the same manner, the luminous fluxes from the edges a and b of the pupil 141 also form images on the eye image pickup element 17, and become pupil edge images a' and b' on the eye image.

FIG. 6B indicates the brightness information (brightness distribution) of a region a in the eye image in FIG. 6A. In FIG. 6B, the brightness distribution in the X axis direction of the eye image is indicated (the horizontal direction of the eye image is the X axis direction, and the vertical direction thereof is the Y axis direction). In Embodiment 1, it is assumed that the coordinates of the corneal reflex images Pd' and Pe' in the X axis direction (horizontal direction) are Xd and Xe, and the coordinates of the pupil edge images a' and b' in the X axis direction are Xa and Xb. As indicated in FIG. 6B, extremely high levels of brightness are acquired at the X coordinates Xd and Xe of the corneal reflex images Pd' and Pe'. In a region from the X coordinate Xa to the X coordinate Xb, which correspond to a region of the pupil 141 (region of a pupil image acquired by the luminous flux from the pupil 141 forming an image on the eye image pickup element 17), extremely low levels of the brightness are acquired, except at the X coordinates Xd and Xe. In a region of the iris 143 outside the pupil 141 (region of the iris outside the pupil image, acquired by the luminous flux from the iris 143 forming an image), an intermediate brightness between the above mentioned two types of brightness is acquired. Specifically, the intermediate brightness between the above mentioned two types of brightness is acquired in a region of which the X coordinate (coordinate in the X axis direction) is smaller than the X coordinate Xa, and in a region of which the X coordinate is larger than the X coordinate Xb.

The X coordinates Xd and Xe of the corneal reflect images Pd' and Pe' and the X coordinates Xa and Xb of the pupil edge images a' and b' can be acquired from the brightness distribution indicated in FIG. 6B. Specifically, the coordinates at which the brightness is extremely high can be acquired as the coordinates of the corneal reflex images Pd' and Pe', and the coordinates at which the brightness is extremely low can be acquired as the coordinates of the pupil edge images a' and b'. In a case where a rotation angle θx of the optical axis of the eyeball 14, with respect to the optical axis of the light-receiving lens 16, is small, the X coordinate Xc of the pupil center image c' (center of the pupil image), acquired by the luminous flux from the pupil center c forming an image on the eye image pickup element 17, can be expressed as Xc (Xa+Xb)/2. In other words, the X coordinate Xc of the pupil center image c' can be calculated from the X coordinates Xa and Xb of the pupil edges images a' and b'. In this way, the coordinates of the corneal reflex images Pd' and Pe' and the coordinate of the pupil center image c' can be estimated.

In step S704, the CPU 3 calculates an image forming magnification 13 of the eyeball image. The image forming magnification 13 is a magnification determined by the position of the eyeball 14 with respect to the light-receiving lens 16, and can be determined using a function of the interval (Xd-Xe) between the corneal reflex images Pd' and Pe'.

In step S705, the CPU 3 calculates the rotation angle of the optical axis of the eyeball 14 with respect to the optical axis of the light-receiving lens 16. The X coordinates of the mid-point between the corneal reflex image Pd and the corneal reflex image Pe approximately matches with the X coordinate of the center of the curvature O of the cornea 142. Therefore if the standard distance from the center of the curvature O of the cornea 142 to the center c of the pupil 141 is Oc, then the rotation Ox of the eyeball 14 on the Z-X plane (plane vertical to the Y axis) can be calculated by the following Expression 1. The rotation angle θy of the eyeball 14 on the Z-Y plane (plane vertical to the X axis) can also be calculated by the same method as the method for calculating the rotation angle θx.

$$\beta \times Oc \times \mathrm{SIN}\ \theta x \approx \{(Xd+Xe)/2\} - Xc \qquad \text{(Expression 1)}$$

In step S706, the CPU 3 determines (estimates) a viewpoint of the user (position to which the line-of-sight is directed: position the user is looking at) on the display surface of the display device 10, using the rotation angles θx and Oy calculated in step S705. If the coordinates of the viewpoint (Hx, Hy) are the coordinates corresponding to the pupil center c, the coordinates of the viewpoint (Hx, Hy) can be calculated using the following Expression 2 and 3.

$$Hx = m \times (Ax \times \theta x + Bx) \qquad \text{(Expression 2)}$$

$$Hy = m \times (Ay \times \theta y + By) \qquad \text{(Expression 3)}$$

Parameter "m" in Expressions 2 and 3 is a constant that is determined by the configuration of the finder optical system (e.g. light-receiving lens 16) of the camera 1, and is a transformation coefficient to transform the rotation angles θx and θy into coordinates corresponding to the pupil center c on the display surface of the display device 10. Parameter "m" is assumed to be predetermined and stored in the memory unit 4. The parameters Ax, Bx, Ay and By are line-of-sight correction parameters that correct the differences of the lines-of-sight depending on the individual, and can be acquired by performing the calibration operation (described later). The parameters Ax, Bx, Ay and By are assumed to be stored in the memory unit 4 before the line-of-sight detection operation starts.

In step S707, the CPU 3 stores the coordinates of the viewpoint (Hx, Hy) in the memory unit 4, and ends the line-of-sight detection operation.

Description on Calibration Operation

Figure 4B:
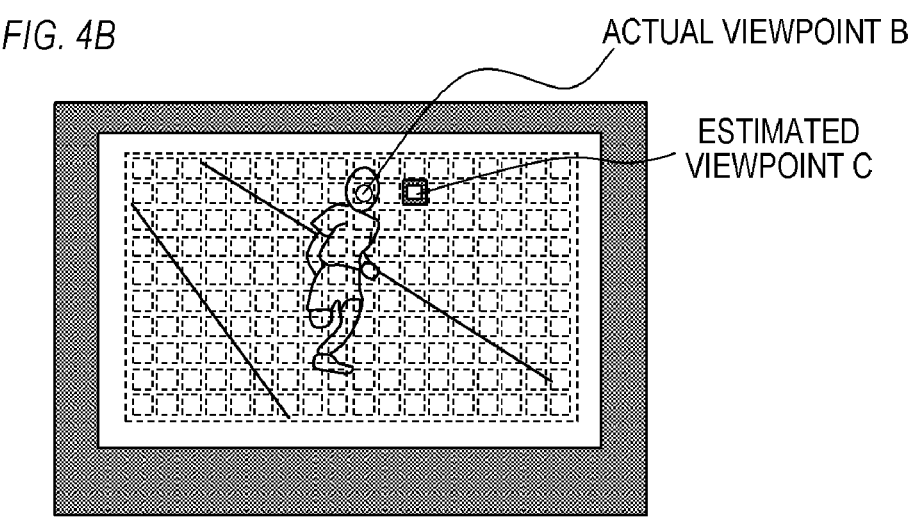

Although a view point can be estimated by the above mentioned line-of-sight detection operation, it may be difficult to estimate a view point accurately in same cases for such reasons as a difference in the shape of an eyeball depending on the individual. Specifically, unless the line-of-sight correction parameters Ax, Ay, Bx and By are adjusted to values appropriate for the user, the actual view point B and the estimated view point C deviate, as illustrated in FIG. 4B. In FIG. 4B, the user is gazing at a person, but the camera 1 incorrectly estimates that the user is gazing at a background, and in this state accurate focus detection and adjustment cannot be performed.

Therefore it is necessary to perform the calibration operation before the camera 1 starts photographing, so as to acquire the line-of-sight correction parameters and store the parameters in the camera 1.

Figure 4C:
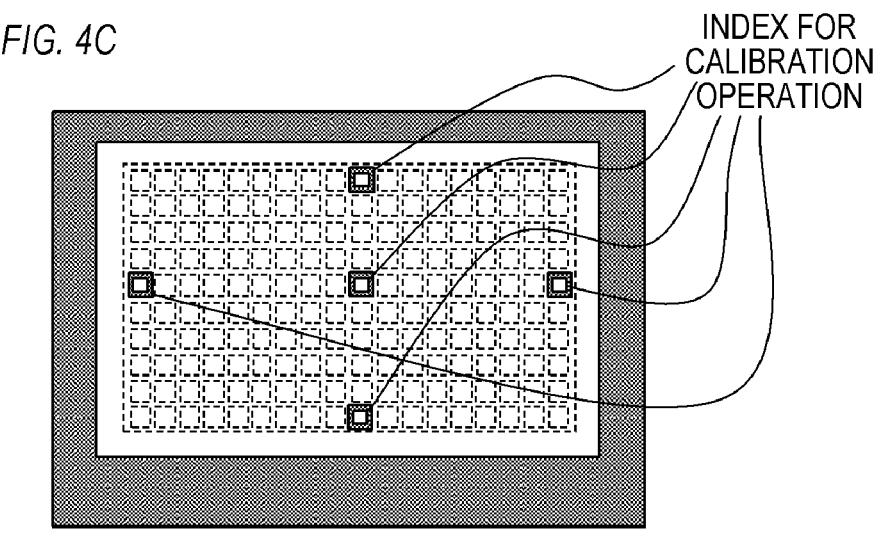

In a conventionally known technique, the calibration operation is performed by emphasizing a plurality of indices displayed at different positions on the display surface of the display device 10, before imaging, as illustrated in FIG. 4C, and having the user look at the indices. Then the line-of-sight detection operation is performed when the user is gazing at each index, and the line-of-sight correction parameters appropriate for the user are determined based on the plurality of viewpoints that are calculated (estimated positions) and the actual coordinates of each index. The method for displaying the indices, however, is not especially limited, as long as the positions at which the user should look looks are indicated, and the graphics of the indices may be displayed or indices may be displayed by changing the brightness or color in the image (e.g., captured image).

Description on State where Line-of-Sight Detection Error is Generated

As described above, in the line-of-sight detection operation, the corneal reflex image and the pupil image (specifically, the coordinates of the corneal reflex image and the coordinates of the center of the pupil image) are detected from the eye image, and the rotation angles θx and θy of the eyeball 14 are acquired based on these detected images. Then the viewpoint is estimated by transforming the rotation angles θx and θy into the coordinates corresponding to the pupil center c on the display surface of the display device 10.

Therefore if an incorrect detection error occurs in the corneal reflex image or pupil image, (if the detection errors of the corneal reflex image and pupil image are large), the rotation angles θx and θy are not correctly calculated, and a line-of-sight detection error (failure of line-of-sight detection; increase in viewpoint detection error; incorrect detection of viewpoint) is generated.

Figure 8A:
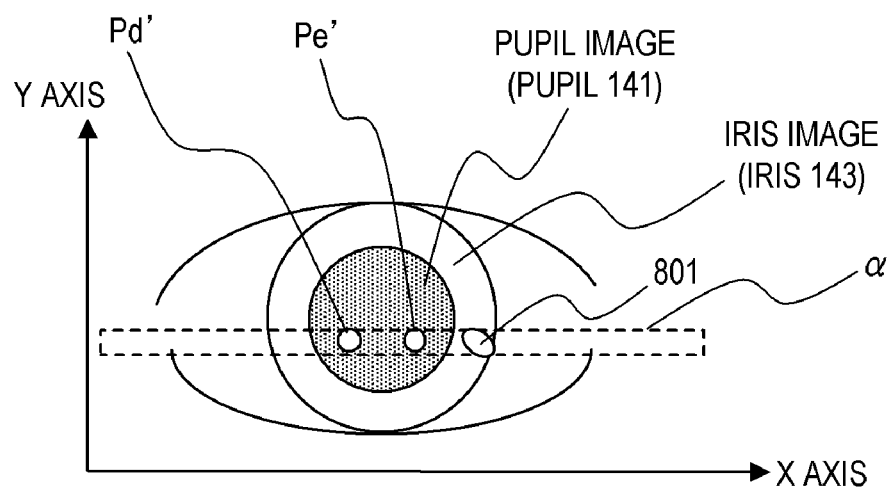
FIG. 8A is a diagram depicting an eye image according to Embodiment 1.
Figure 8B:
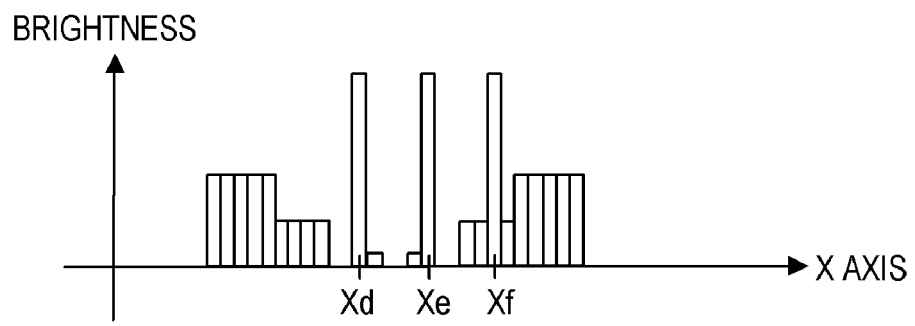
FIG. 8B is a graph indicting a brightness distribution of the eye image according to Embodiment 1.

An example of the state where a line-of-sight detection error is generated will be described with reference to FIGS. 8A and 8B. In a case where the user is wearing eye glasses, light from at least one of the light sources 13a and 13b (light source to illuminate the eyeball 14) may be reflected by the surface of the eye glasses and enter the eye image pickup element 17 via the eye piece 12, and be captured as a ghost in the eye image. FIG. 8A is a schematic diagram of an eye image captured by the eye image pickup element 17 (eyeball image projected onto the eye image pickup element 17), and FIG. 8B is a graph indicating an output intensity of the CMOS in the eye image pickup element 17. In FIG. 8A, a ghost 801 formed by the eye glasses is captured. As indicated in FIG. 8B, the output intensity of the ghost 801 is similar to the output intensity of the corneal reflex image.

In the state indicated in FIGS. 8A and 8B, the ghost 801 may be incorrectly detected as the corneal reflex image, since the output intensity of the ghost 801 is similar to the output intensity of the corneal reflex image. Specifically, the X coordinate Xf of the ghost 801 may be incorrectly detected as the X coordinates Xd of the corneal reflex image Pd' or the X coordinate Xe of the corneal reflex image Pe'. If a corneal reflex image is incorrectly detected, the image forming magnification 13 of the eyeball image is not accurately calculated, and calculation errors of the rotation angles θx and θy increase. In this case, if the estimated viewpoint (viewpoint acquired by converting the calculated rotation angles θx and θy) is located outside the display surface of the display device 10, it can be easily determined that the line-of-sight detection error occurred (viewpoint estimation accuracy of viewpoint is low). However, if the estimated viewpoint is located inside the display surface of the display device 10, it is possible that the viewpoint can be correctly or incorrectly estimated (that is, it is difficult to correctly determine the estimation accuracy of the viewpoint), and it is difficult to correctly determine whether a line-of-sight detection error occurred.

Figure 9A:
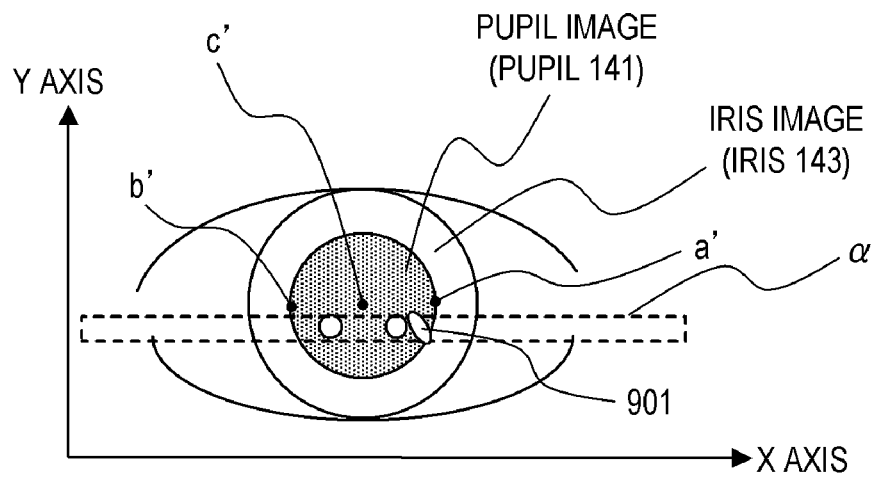
FIG. 9A is a diagram depicting an eye image according to Embodiment 1.
Figure 9B:
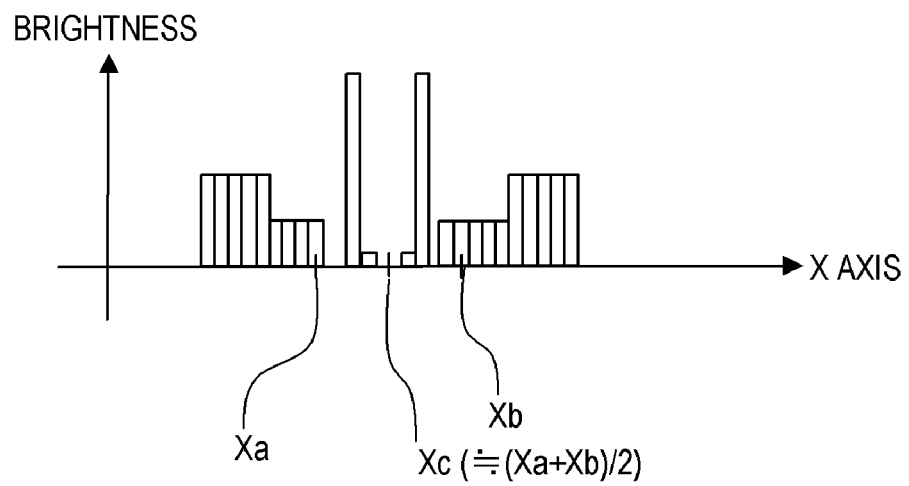
FIG. 9B is a graph indicating a brightness distribution of the eye image according to Embodiment 1.

An example of the state where a line-of-sight detection error is generated will be described with reference to FIGS. 9A and 9B. FIG. 9A is a schematic diagram of an eye image captured by the eye image pickup element 17 (eyeball image projected onto the eye image pickup element 17), and FIG. 9B is a graph indicating an output intensity of the CMOS in the eye image pickup element 17. In FIG. 9A, a ghost 901, formed by eye glasses, is captured. As indicated in FIG. 9B, the output intensity of the ghost 901 is similar to the output intensity of the iris image.

In the state of FIGS. 9A and 9B, the boundary between the pupil image and the iris image (X coordinates Xa and Xb of the pupil edge images a' and b') may not be correctly detected, since the output intensity of the iris image is similar to the output intensity of the ghost 901. If the X coordinates Xa and Xb are not correctly detected, the coordinate of the center of the pupil image (X coordinate Xc of the pupil center image c') is not correctly calculated, and calculation errors of the rotation angles θx and θy increase. In this case, if the estimated viewpoint is located outside the display surface of the display device 10, or if the pupil diameter estimated from the X coordinates Xa and Xb is outside the expected range (e.g. outside the range of the pupil diameter of an ordinary adult), it can be easily determined that the line-of-sight detection error occurred. However, if the estimated viewpoint is located inside the display surface of the display device 10 and the estimated pupil diameter is within the expected range, it is possible that the viewpoint is correctly estimated, and it is difficult to correctly determine whether the line-of-sight detection error occurred or not.

As mentioned above, the estimation accuracy of the viewpoint is largely influenced by the detection error of the corneal reflex image and the detection error of the pupil image. The detection error of the pupil image in particular tends to be large (detection results of the pupil image tends to disperse) compared with the detection error of the corneal reflex image, because of the influence of noise of the corneal reflex image and the eye image pickup element 17, and the like. Therefore the viewpoint estimation accuracy tends to easily drop when the detection error of the pupil image is large (estimated viewpoints tend to disperse easily when the detection result of the pupil image disperses).

Specifically, the calculation error of the interval of a plurality of corneal reflex image "Xd-Xe", the calculation error of the center position of the plurality of corneal reflex images "(Xd+Xe)/2", the calculation error of the center position of the pupil image "Xc", and the like, largely influence the estimation accuracy of the viewpoint. Therefore, it can be determined whether the line-of-sight detection error occurred, based on the calculation error of the interval of the plurality of corneal reflex images "Xd-Xe", the calculation error of the center position of the plurality of corneal reflex images "(Xd+Xe)/2", the calculation error of the center position of the pupil image "Xc", and the like.

The case where the line-of-sight detection error is generated by a ghost was described, but the line-of-sight detection error could be generated due to various other reasons. For example, the line-of-sight detection error may be generated when the pupil cannot be correctly detected due to an eye lids or eye lashes. Further, the line-of-sight detection error may be generated when the corneal reflex image is reflected on tears, and is detected incorrectly. Furthermore, the line-of-sight detection error may be generated due to the influence of ambient light around the user.

Description of First Error Determination

A first method for error determination of the line-of-sight detection (determination whether the line-of-sight detection by the line-of-sight detection circuit 201 is in error or not; determination whether the line-of-sight was correctly detected) will be described. As mentioned above, if the error determination is performed based on a single eye image, it is difficult to perform the error determination at high accuracy unless the detection error is extremely large. Therefore in the first method, the error determination is performed based on the current eye image and the eye image in the past. Specifically, the error determination is performed based on a plurality of corneal reflex images detected from the current eye image and a plurality of corneal reflex images detected from the eye image in the past. Thereby the error determination can be performed at high accuracy. The eye image in the past may or may not be an eye image captured immediately before the current eye image. For the eye image in the past, a single eye image may be used or a plurality of eye images may be used.

The interval of a plurality of corneal reflex images "Xd-Xe" is strongly correlated with the distance from a finder (e.g. light-receiving lens 16) to the cornea. In the case of using the camera 1, an operation for the eyeball 14 of the user looking into the finder to move back and forth in the Z direction (direction parallel with the optical axis of the light-receiving lens 16) is not normally performed. This means that while the user is looking into the finder, the interval of the plurality of corneal reflex images Xd-Xe is approximately constant.

Therefore in the first method, the interval of the plurality of corneal reflex images detected from the current eye image and the interval of the plurality of corneal reflex images detected from the eye image in the past are compared to perform the error determination. Thereby the error determination can be performed at high accuracy. This error determination may be regarded as the error determination of the line-of-sight detection or may be regarded as the error determination of detection (calculation) of the interval of a plurality of corneal reflex images "Xd-Xe".

The error determination operation of the line-of-sight detection (first method) will be described with reference to the flow chart in FIG. 10.

In step S1001, the CPU 3 determines whether a plurality of corneal reflex images were detected from the current eye image, and processing advances to step S1002 if a plurality of corneal reflex images were detected, or processing advances to step S1007 if a plurality of corneal reflex images were not detected.

In step S1007, the CPU 3 determines that the current line-of-sight detection is in error.

In step S1002, the CPU 3 calculates the interval of the plurality of corneal reflex images (reflex image interval) detected from the current eye image, and stores the reflex image interval in the memory unit 4. In a case where a number of light sources that illuminate the eyeball 14 is three or more, and three or more corneal reflex images are detected, a representative value (e.g. man value, maximum value, minimum value, mode value, median value) of the plurality of reflex image intervals acquired from the detected three or more corneal reflex images may be calculated. All the reflex image intervals acquired from the three or more corneal reflex images may be calculated, or a part of the reflex image intervals may be calculated. For example, in a case where four light sources (two rows×two columns) exist, only the interval of the two corneal reflex images disposed in the row direction may be calculated, or only the interval of the two corneal reflex images disposed in the column direction may be calculated, or only the interval of two corneal reflex images disposed in the diagonal direction may be calculated. Out of these three types of reflex image intervals, only two types of reflex image intervals may be calculated.

In step S1003, the CPU 3 determines whether the reflex image interval was calculated for at least a predetermined number of times (e.g. five times, 10 times), in other words, whether the processing in step S1002 was performed for at least a predetermined number of times. Then the CPU 3 advances processing to step S1004 if the reflex image interval was calculated for at least the predetermine number of times, or ends the error determination operation without performing the error determination if the number of times of calculating the reflex image interval does not reach the predetermined number of times.

In step S1004, the CPU 3 acquires the reflex image interval from the memory unit 4, calculated from the eye image in the past. One reflex image interval calculated from a single eye image in the past may be acquired, but in Embodiment 1, it is assumed that the CPU 3 acquires one reflex image interval or more calculated in a predetermined period in the past, and calculates a mean value of one reflex image interval or more that were acquired. Instead of the mean value, a different representative value (e.g. a maximum value, a minimum value, a mode value, a median value) may be calculated. The predetermined period in the past is, for example, a period for five frames up to the present, or a period at a timing that is five frames before the present to a timing that is two frames before the present.

In step S1005, the CPU 3 calculates a difference between the reflex image interval acquired in step S1004 (reflex image interval in the past: mean value in Embodiment 1) and the reflex image interval calculated in step S1002 (current reflex image interval).

In step S1006, the CPU 3 compares the difference calculated in step S1005 with a predetermined threshold, and determines whether the difference is the threshold or more. If the difference is the predetermined threshold or more, the CPU 3 advances processing to step S1007, and determines that the current line-of-sight detection is in error. If the difference is less than the predetermined threshold, the CPU 3 determines that the current line-of-sight detection is a success, and ends the error determination operation.

Description on Second Error Determination

A second method for the error determination of the line-of-sight detection will be described. In the second method as well, the error determination is performed based on the current eye image and the eye image in the past. Specifically, in the second method, the error determination is performed based on a plurality of corneal reflex images and pupil images detected from the current eye image, and a plurality of corneal reflex images and pupil images detected from the eye image in the past. Thereby the error determination can be performed at high accuracy.

The center position of the plurality of corneal reflex images "(Xd+Xe)/2" and the center position of the pupil image "Xc" has a strong correlation. If the center position of the pupil image "Xc" moves, the center position of the plurality of the corneal reflex images "(Xd+Xe)/2" also moves in the same direction as the center position of the pupil image "Xc", unless the head of the user looking into the finder does not move translationally. Also in the case of using the camera 1, the head of the user looking into the finder does not perform continuous translational movement under normal circumstances. Hence movement of only one of the center position of the plurality of corneal reflex images "(Xd+Xe)/2" and the center position of the pupil image "Xc", does not occur under normal circumstances.

Therefore in the second method, the error detection is performed by comparing the following two types of distances. Thereby the error determination can be performed at high accuracy. This error determination may be regarded as the error determination of the line-of-sight detection, or may be regarded as the error determination of the detection (calculation) of the center position of a plurality of corneal reflex images "(Xd+Xe)/2", or the error determination of the detection (calculation) of the center position of the pupil image "Xc".

- The distance from the position representing a plurality of corneal reflex images (representative position: e.g. center position) detected from the current eye image, to the position of the pupil image (e.g. center position) detected from the current eye image
- The distance from the position representing a plurality of corneal reflex images (representative position: e.g. center position) detected from the eye image in the past, to the position of the pupil image (e.g. center position) detected from the eye image in the past However, even if there are three or more light sources to illuminate the eyeball 14, the same number of corneal reflex images as the light sources are not always detected, and the representative position (e.g. center position) of the plurality of corneal reflex images changes depending on the number and arrangement of the corneal reflex images that were actually detected.

Figure 11:
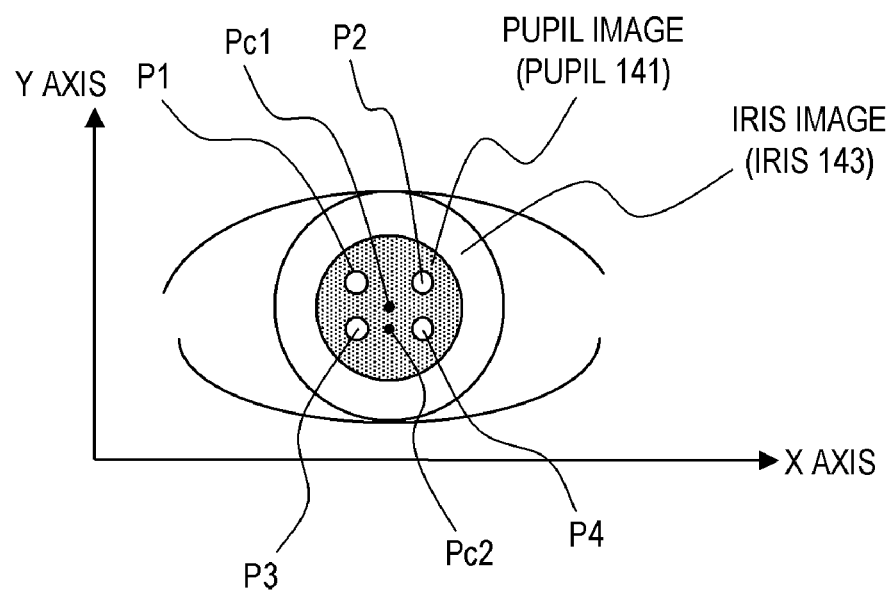
FIG. 11 is a diagram depicting an eye image according to Embodiment 1.

FIG. 11 is a schematic diagram depicting an eye image captured by the eye image pickup element 17 (eyeball image projected onto the eye image pickup element 17). The eye image in FIG. 11 is an eye image in the case where there are four light sources to illuminate the eyeball 14, and includes four corneal reflex images P1 to P4. In the case where all the corneal reflex images P1 to P4 are detected, the center position Pc1 of the corneal reflex images P1 to P4 is calculated as the center position of the plurality of corneal reflex images. On the other hand, in the case where the corneal reflex images P1 and P2 were not detected, and only the corneal reflex images P3 and P4 were detected, the center position Pc1 of the corneal reflex images P1 to P4 is not calculated as the center position of the plurality of corneal reflex images, and the center position Pc2 of the corneal reflex images P3 and P4 is calculated instead.

In this way, the representative position of a plurality of corneal reflex images may change depending on the number and arrangement of the detected corneal reflex images, hence in some cases the representative position alone of the plurality of corneal reflex images may change considerably. If an eye image, in which a number of detected corneal reflex images is different from that of the current eye image, is used as the eye image in the past, the above mentioned comparison cannot be performed appropriately. Therefore for the eye image in the past, it is preferable to use an eye image that at least satisfies the condition that a number of detected corneal reflex images is approximately the same as that of the current image. Further, for the eye image in the past, it is more preferable to use an eye image that also satisfies the condition that the arrangement of the detected corneal reflex images is approximately the same as that of the current image. In the case of performing the error determination using the first method as well, it is preferable to use an eye image that satisfies these conditions for the eye image in the past.

The error determination operation of the line-of-sight detection (second method) will be described with reference to the flow chart in FIG. 12.

In step S1201, the CPU 3 determines whether the reflex center (center position of a plurality of corneal reflex images) and the pupil center (center position of the pupil image) were calculated based on the current eye image. Then the CPU 3 advances processing to step S1202 if both the reflex center and the pupil center were calculated, or advances processing to step S1208 if at least one of the reflex center and the pupil center was not calculated.

In step S1208, the CPU 3 determines that the current line-of-sight detection is in error.

In step S1202, the CPU 3 determines the current detection state of the corneal reflex images (a number and arrangement of a plurality of corneal reflex images detected from the current eye image), and determines which light source of the corneal reflex image was detected. It is possible that a ghost is incorrectly detected as the corneal reflex image, but this type of detection error is determined as an error in the first method mentioned above. The corneal reflex images may be detected considering the arrangements, sizes, and the like, of a plurality of images detected as candidates of the corneal detection images, so that a ghost is less likely to be detected incorrectly as the corneal reflex image. In the case where a higher number of images than the number of light sources was detected as the candidates of the corneal reflex image, a plurality of viewpoints may be estimated from a plurality of combinations of a same number of candidates as the number of light sources. Then each candidate of the combinations of which estimated viewpoint is most likely to be an actual viewpoint, such as a viewpoint closest to a viewpoint in the previous time, may be detected as the corneal reflex image.

In step S1203, the CPU 3 calculates the distance between the reflex center and the pupil center of the current eye image, and stores the distance in the memory unit 4.

In step S1204, the CPU 3 determines whether the center-to-center distance (distance between the reflex center and the pupil center) was calculated at least for a predetermined number of times (e.g. five times, 10 times) in a state where the detection state of the corneal reflex images (a number and arrangement of the detected plurality of corneal reflex images) is approximately the same as the current state. In other words, the CPU 3 determines whether the processing in step S1203 was performed at least a predetermined number of times in a state where the detection state of the corneal reflex images is approximately the same as the current state. Then if the center-to-center distance was calculated for at least the predetermined number of times in the state where the detection state of the corneal reflex images is approximately the same as the current state, the CPU 3 advances processing to step S1205. If the number of times of calculating the center-to-center distance in the state where the detection state of the corneal reflex images is approximately the same as the current state did not reach the predetermined number of times, the CPU 3 ends the error determination operation without performing the error determination.

In step S1205, the CPU 3 acquires the center-to-center distance from the memory unit 4 calculated from the eye image in the past, of which detection state of the corneal reflex images is approximately the same as the current eye image. In Embodiment 1, the CPU 3 acquires at least one center-to-center distance calculated in a predetermined period (predetermined length of a period) in the past, of which detection state of the corneal reflex images is approximately the same as the current state, and calculates a mean value of at least one center-to-center distance. Instead of the mean value, a different representative value (e.g. a maximum value, a minimum value, a mode value, a median value) may be calculated. One enter-to-center distance calculated from a single eye image in the past may be acquired.

In step S1206, the CPU 3 calculates a difference between the center-to-center distance acquired in step S1205 (center-to-center distance in the past: mean value in Embodiment 1) and the center-to-center distance calculated in step S1203 (current center-to-center distance).

In step S1207, the CPU 3 compares the difference calculated in step S1206 with a predetermine threshold, and determines whether the difference is the threshold or more. If the difference is the predetermined threshold or more, the CPU 3 advances processing to step S1208, and determines that the current line-of-sight detection is in error. If the difference is less than the predetermined threshold, the CPU 3 determines that the current line-of-sight detection is a success, and ends the error determination operation.

Description of Camera Operation

Operation of the camera 1 will be described with reference to the flow chart in FIG. 13.

When the power of the camera 1 is turned ON, the image pickup element 2 starts acquiring a through image in step S1301, transmits image signals of through the image to the CPU 3, and the CPU 3 displays the acquired through image on the display device 10. The user checks the object by viewing the through image displayed on the display device 10. The power of the camera 1 is turned ON/OFF in accordance with the user operation on the camera 1.

Figure 13:
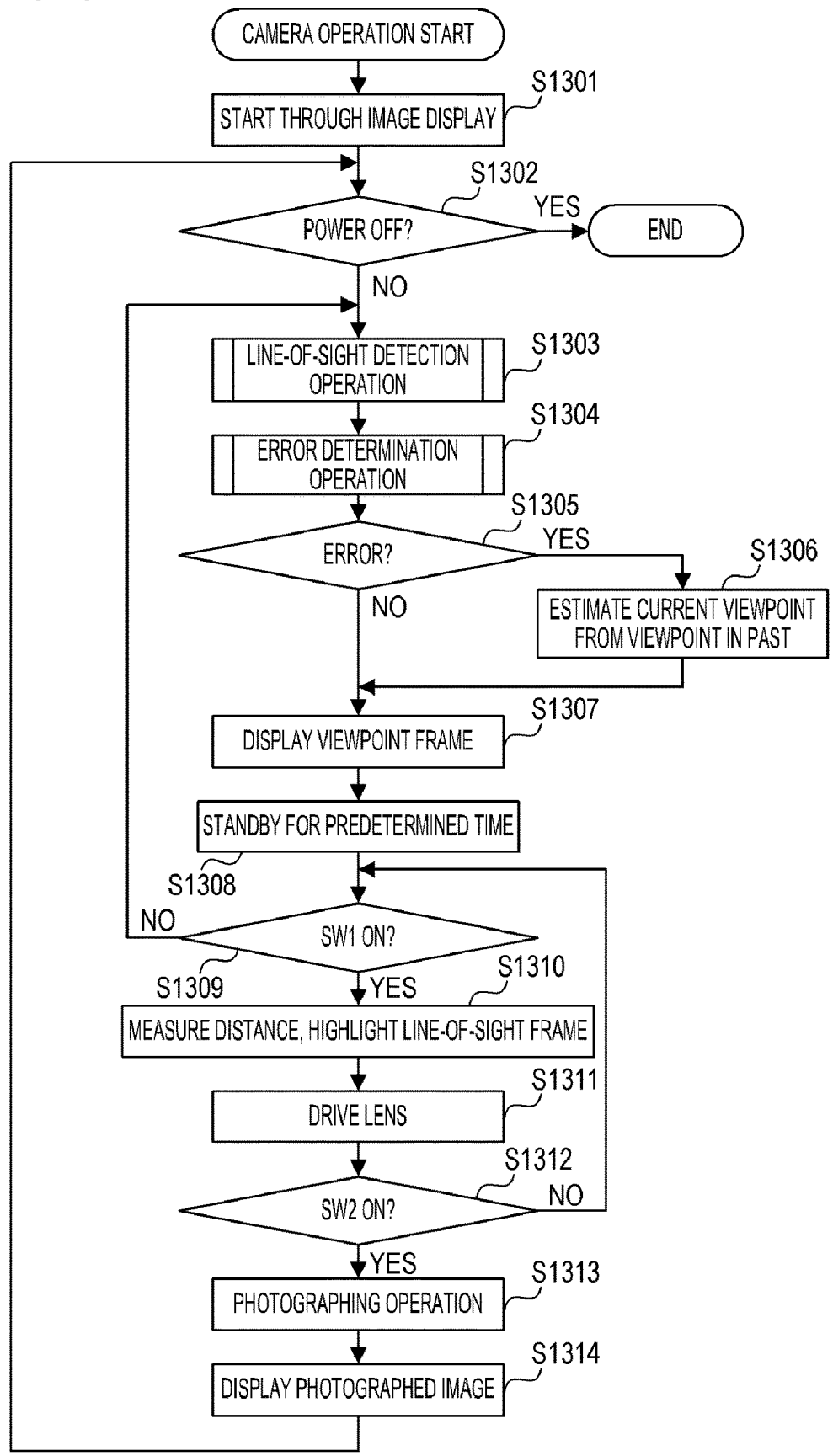
FIG. 13 is a flow chat of a camera operation according to Embodiment 1.

In step S1302, the CPU 3 determines whether the power of the camera 1 is turned OFF or not, and ends the camera operation in FIG. 13 if the power is turned OFF, or advances processing to step S1303 if the power is not turned OFF.

In step S1303, the CPU 3 starts acquiring an eye image of the user who started to view the through image in step S1301, and performs the line-of-sight detection operation in FIG. 7. By the line-of-sight detection operation, the coordinates of a pupil image and corneal reflex image on the eye image are detected, and the coordinates of the viewpoint on the display surface of the display device 10 are calculated.

Figure 10:
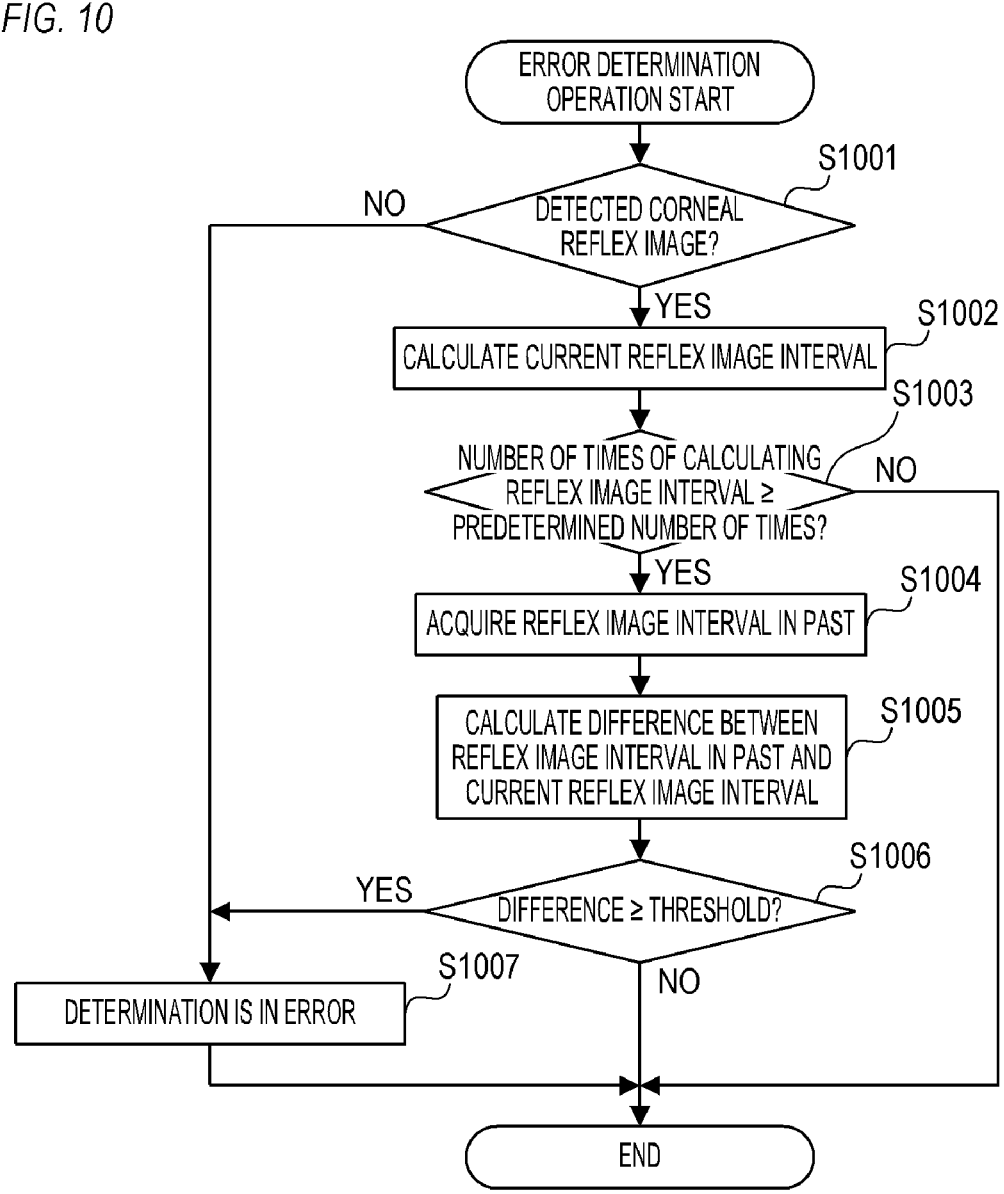
FIG. 10 is a flow chart of an error determination operation (first method) according to Embodiment 1.
Figure 12:
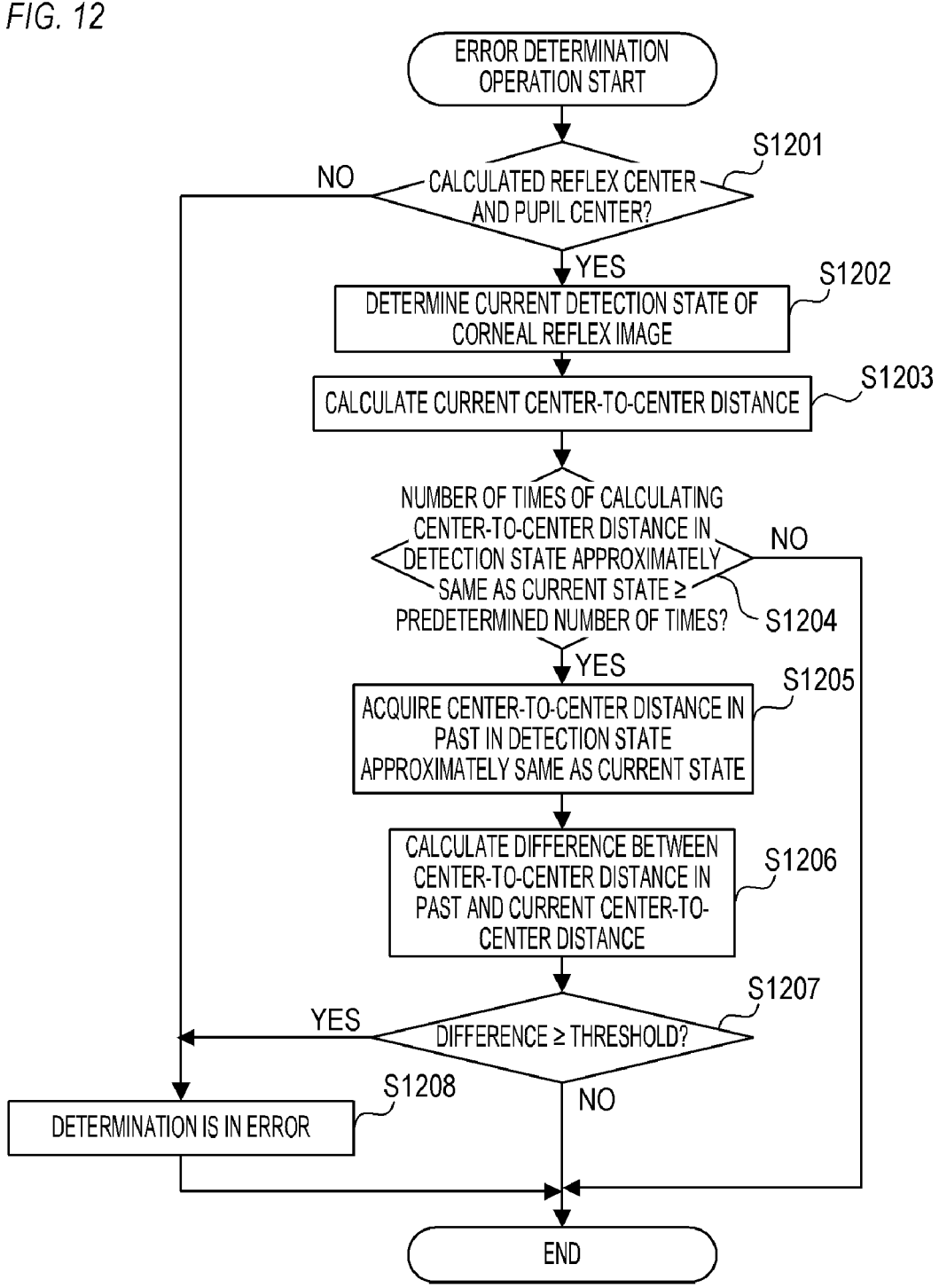
FIG. 12 is a flow chart of an error determination operation (second method) according to Embodiment 1.

In step S1304, the CPU 3 performs the error determination operation in FIGS. 10 and 12.

In step S1305, the CPU 3 determines whether the current line-of-sight detection is in error or not in accordance with the result of the error determination operation in step S1304. Then the CPU 3 advances processing to step S1306 if the current line-of-sight detection is in error, or advances processing to step S1307 if the current line-of-sight detection is not in error (success).

In step S1306, the CPU 3 estimates a current viewpoint from a plurality of viewpoints which were calculated in a predetermined period in the past. In a case where the processing in step S1306 was performed, the viewpoint estimated in step S1306 is used as the current viewpoint, instead of the viewpoint calculated in step S1303. The method for estimating the viewpoint is not especially limited. For example, the current viewpoint can be estimated based on the moving amount, moving direction, and the like, of the viewpoints in the past. In the case where the viewpoint is moving, the current viewpoint can be estimated by smoothly extending the locus of the viewpoint. In the case where the viewpoint stops approximately at one point (e.g. oscillating with one point at the center), the center position, average position, or the like, of a plurality of viewpoints can be estimated as the current viewpoint.

In step S1307, the CPU 3 superimposes a viewpoint frame on the through image at a position corresponding to the current viewpoint (estimated position), so that the line-of-sight frame (frame indicating the viewpoint) is displayed at the current viewpoint (estimated position) on the display surface of the display device 10.

Thereby the display, as illustrated in FIG. 4A (display where the line-of-sight frame is superimposed on the through image), is performed, and the current viewpoint A (estimated position) can be notified to the user. Instead of the viewpoint frame, a point indicating the viewpoint, for example, may be displayed.

In step S1308, the CPU 3 stands by for a predetermined time.

In step S1309, the CPU 3 determines whether the user pressed (half depressed) the release button 5 to turn the switch SW1 ON. For example, in a case where the user consents to focus on a position of the viewpoint frame (frame indicating the estimated viewpoint) displayed superimposed on the through image, the user half depresses the release button 5 to turn the switch SW1 ON. The CPU 3 advances processing to step S1310 if the switch SW1 is turned ON, or returns processing to step S1303 and estimates a viewpoint again if the switch SW1 is not turned ON.

In step S1310, the CPU 3 performs the distance-measuring operation at the position of the current line-of-sight frame, and notifies the user that the distance-measuring operation was performed by an emphasized display, such as changing the displayed color of the line-of-sight frame.

In step S1311, the CPU 3 drives the lens 101 in the photographing lens unit 1A in accordance with the distance measurement result acquired in step S1310. Thereby focusing at the position of the viewpoint frame, which is displayed superimposed on the through image, is implemented.

In step S1312, the CPU 3 determines whether the user completely pressed (fully depressed) the release button 5 to turn the switch SW2 ON. For example, in the case where the user consents to photograph at the current focus position, the user fully depresses the release button 5 to turn the SW2 ON. The CPU 3 advances processing to step S1313 if the switch SW2 is turned ON, or returns processing to step S1309 if the switch SW2 is not turned ON.

In step S1313, the CPU 3 performs the photographing operation, whereby the image signal acquired by the image pickup element 2 is stored in the memory unit 4.

In step S1314, the CPU 3 displays the image (photographed image) stored in the memory unit 4 in step S1313 on the display device 10 for a predetermined time, and returns processing to step S1302.

Conclusion

As described above, according to Embodiment 1, not only the current eye image, but also an eye image in the past is used for the error determination of the line-of-sight detection. Specifically, the error determination is performed based on the time-based changes in the characteristics of the eye image. Thereby the error determination of the line-of-sight detection can be performed at high accuracy. Furthermore, the line-of-sight (viewpoint) of which detection error is large can be appropriately eliminated, and the user can appropriately improve the visibility state, whereby focusing at a position based on the accurate line-of-sight can be implemented.

Embodiment 2

Embodiment 2 of the present invention will be described next. In the following, description on the aspects (e.g. configuration, processing) the same as Embodiment 1 is omitted, and aspects that are different from Embodiment 1 will be described. In Embodiment 1, an example of performing the error determination during camera operation was described. In Embodiment 2, an example of performing the error determination in a state where an index to be viewed is displayed on the display device 10 will be described. The intended use of the index is not especially limited, but in Embodiment 2, a case of using the index for the calibration operation will be described.

As described om Embodiment 1, the calibration operation is performed by emphasizing a plurality of indices located at different positions on the display device 10 before capturing an image, and having the user view these indices. For example, as illustrated in FIG. 4C, the indices are displayed at five locations on the display surface of the display device 10: at the center, the upper side of the center, the lower side of the center, the left side of the center, and the right side of the center. In Embodiment 2, the indices are displayed one at a time, but all five indices may be displayed at the same time, and an index, out of the five indices, may be emphasized sequentially. By this, the user views a displayed index (emphasized index). In other words, in the calibration operation, a position where the user should view is specified by an index.

Even during the calibration operation, the line-of-sight detection in FIG. 7 is performed, and a line-of-sight detection error may be generated for various reasons. For example, as described with reference to FIGS. 8A, 8B, 9A and 9B, the line-of-sight detection error is generated when a corneal reflex image or pupil image is incorrectly detected. If an incorrect line-of-sight detection result (viewpoint) is used, incorrect line-of-sight correction parameters are determined, and the line-of-sight cannot be appropriately corrected. If the error determination operation in FIG. 10 or 12 is performed during the calibration operation, the appropriate line-of-sight correction parameters can be determined by eliminating the incorrect line-of-sight detection result.

Further, when the position of the pupil image or the corneal reflex image in the eye image changes greatly, (that is, when the position where the user is viewing (viewpoint) changes greatly), the features of the pupil image or the corneal reflex image change greatly as well due to the influence of an uneven exposure caused by a drop in peripheral light quantity, aberration of the lens, and the like. For example, the shape of the pupil image, brightness of the pupil image, shape of the corneal reflex image, brightness of the corneal reflex image, and the like, change greatly. The interval of the plurality of corneal reflex images and the distance between the center position of the plurality of corneal reflex images and the center position of the pupil image also change greatly. Therefore if the information acquired before changing the viewpoint is used for error determination when the actual viewpoint changed greatly, it may be incorrectly determined that the line-of-sight detection is in error, even if the line-of-sight detection is actually a success. Therefore, it is preferable that the information acquired before changing the viewpoint is not used. During the calibration operation, the viewpoint may change greatly in accordance with the switching of the display positions of the indices, hence the error determination of the line-of-sight detection can be performed at high accuracy by easily and appropriately eliminating the information acquired before changing the viewpoint. For example, the error determination of the line-of-sight can be performed at high accuracy if the eye image, which was captured in the state where the display position of the index, the same as that of the current image, is used as the eye image in the past.

Calibration Operation

Figure 14:
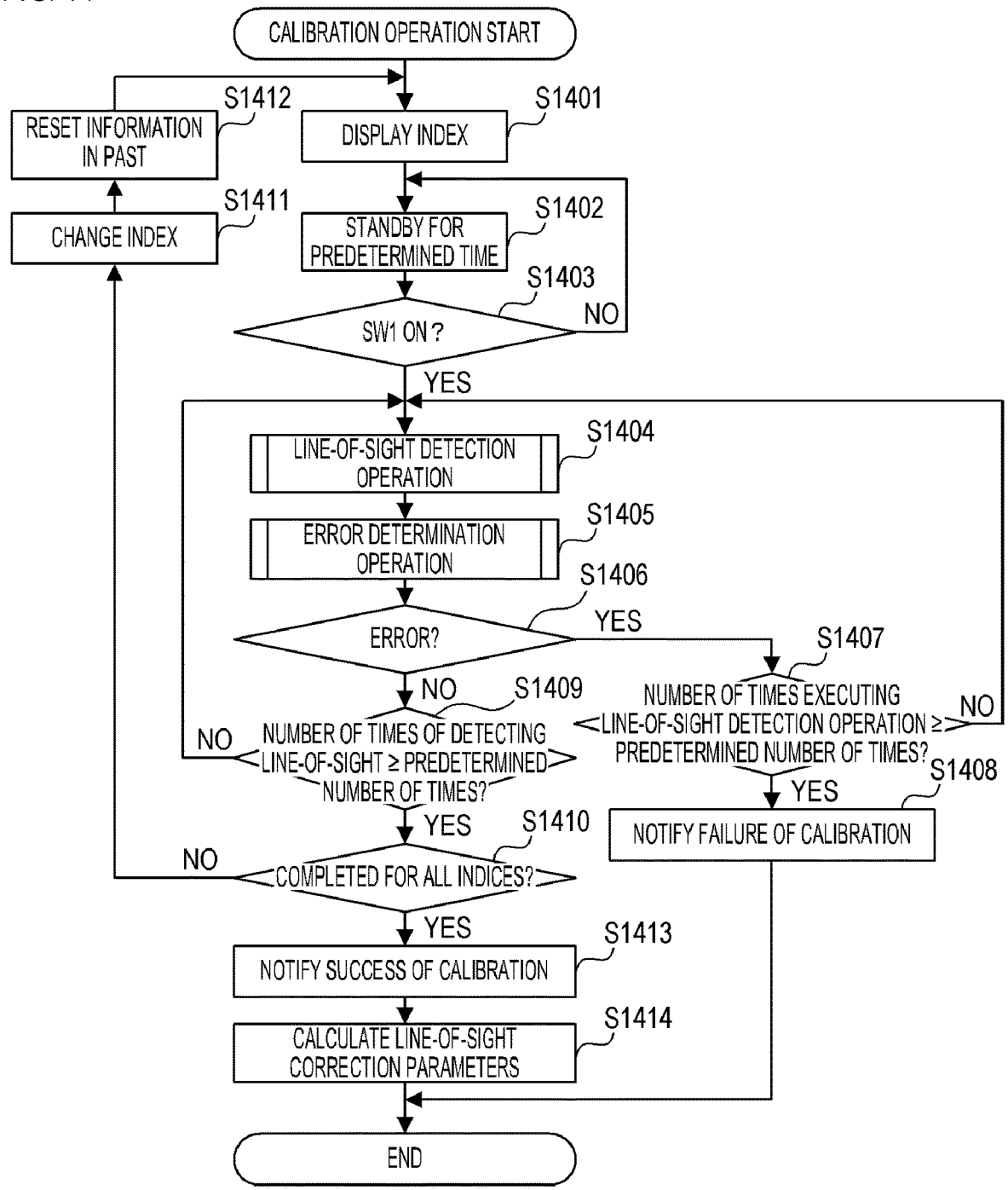
FIG. 14 is a flow chart of a calibration operation according to Embodiment 2.

The calibration operation according to Embodiment 2 will be described with reference to the flow chart in FIG. 14. The calibration operation is started responding to the user operation to instruct the start of the calibration operation, for example.

In step S1401, the CPU 3 displays indices, for the user to gaze at on the display device 10.

In step S1402, the CPU 3 stands by for a predetermined time.

In step S1403, the CPU 3 determines whether the user pressed (half depressed) the release button 5 to turn the switch SW1 ON. For example, the user half depresses the release button 5 to indicate that an index is gazed at and to turn the switch SW1 ON. The CPU 3 advances processing to step S1404 if the switch SW1 is turned ON, or returns processing to step S1402 if the switch SW1 is not turned ON.

In step S1404, the CPU 3 performs the line-of-sight detection operation in FIG. 7. By the line-of-sight detection operation, the coordinates of the pupil image and the corneal reflex images in the eye image are detected, and the coordinates of the viewpoint on the display surface of the display device 10 are calculated.

In step S1405, the CPU 3 performs the error determination operation in FIG. 10 or FIG. 12.

In step S1406, the CPU 3 determines whether the current line-of-sight detection is in error or not in accordance with the result of the error determination operation in step S1405. The CPU 3 advances processing to step S1407 if the current line-of-sight detection is in error, or advances processing to S1409 if the current line-of-sight detection is not in error (success).

In step S1407, the CPU 3 determines whether a number of times of executing the line-of-sight detection operation (error count of the line-of-sight detection) is a predetermined number of times or more. Then the CPU 3 returns processing to step S1404 if the number of times of executing the line-of-sight detection operation is less than the predetermined number of times, or advances processing to step S1408 if the number of times of executing the line-of-sight detection operation is the predetermined number of times or more. The number of times of executing the line-of-sight detection operation is counted by the CPU 3.

In step S1408, the CPU 3 determines that calibration (determination of line-of-sight correction parameters) cannot be performed appropriately, and notifies the user that the calibration failed. Then the CPU 3 ends the calibration operation.

In step S1409, the CPU 3 determines whether a number of times of detecting the viewpoint (a number of times when the viewpoint was detected; a number of times of succeeding the line-of-sight detection) is a predetermined number of times or more. Then the CPU 3 returns the processing to step S1404 if the number of times of detecting the viewpoint is less than the predetermined number of times, or advances processing to step S1410 if the number of times of detecting the viewpoint is the predetermined number of times or more. The number of times of detecting the viewpoint is counted by the CPU 3.

In step S1410, the CPU 3 determines whether the line-of-sight detection (processing in step S1401 to S1409) has completed for all the indices. Then the CPU 3 advances processing to step S1411 if there is at least one index for which the line-of-sight detection is not yet performed, or advances processing to step S1413 if the line-of-sight detection has completed for all the indices.

In step S1411, the CPU 3 changes (switches) the index displayed in step S1401 to the next index.

In step S1412, the CPU 3 resets the information acquired in a state where the index before the change was displayed, so that the eye image, captured in the state where the index before the change was displayed, is not used use as the eye image in the past in the error determination operation. For example, the CPU 3 resets the interval of a plurality of corneal reflex images, the distance between the center position of the plurality of corneal reflex images and the center position of the pupil image, and the like. The CPU 3 also resets a number of times counted for processing in steps S1407 and S1409 (a number of times of executing the line-of-sight detection operation and a number of times of detecting the viewpoint). Then the CPU 3 returns processing to step S1401.

In step S1413, the CPU 3 notifies the user that the calibration operation succeeded.

In step S1414, the CPU 3 calculates the line-of-sight correction parameters based on the viewpoint that is detected for each index, stores the line-of-sight correction parameters to the memory unit 4, and ends the calibration operation.

Conclusion

As described above, according to Embodiment 2, the error determination of the line-of-sight detection can be performed at high accuracy during the calibration operation, therefore the line-of-sight correction parameters can be determined at high accuracy. Furthermore, the eye image, which was captured in a state where the display position of the index to which the user should view is the same as that of the current eye image, is used as the eye image in the past. Hence, the error determination of the line-of-sight detection can be performed at high accuracy by easily and appropriately eliminating the information acquired before the actual viewpoint was changed greatly.

Embodiments 1 and 2 are merely examples, and configurations that are acquired by appropriately modifying or changing the configurations of Embodiments 1 and 2 within the scope of the spirit of the present invention are also included in the present invention. Furthermore, the configuration acquired by appropriately combining the configurations of Embodiments 1 and 2 is also included in the present invention.

Further, an example of detecting the line-of-sight of the user gazing into the finder of the camera was described above, but the present invention is not limited to this. For example, in a case of performing the line-of-sight detection in a head mount display (HMD), which is worn on the head of the user to physically sense virtual reality (VR) or the like, as well, the positional relationship between the HMD and an eye ball (eye ball of user wearing the HMD) is normally constant in general. Therefore the effects of the present invention described in Embodiments 1 and 2 can be implemented in this case as well. In the same manner, the present invention can be applied to spectacle type line-of-sight detection apparatuses, such as augmented reality (AR) glasses. The present invention can be applied to all electronic devices that estimate the viewpoint using an eye image. In particular, the present invention can be suitably applied to an electronic device which has an ocular window frame (e.g. ocular window frame of a camera, a frame of spectacles) that limits the field of view (since the positional relationship of the ocular window frame and an eyeball (an eyeball gazing into the ocular window frame) is normally constant in general).

As described above, according to Embodiments 1 and 2, a line-of-sight detection apparatus that implements highly accurate error determination can be provided to a camera, an HMD, and a spectacle type device by using not only a current eye image but also an eye image in the past for error determination of the line-of-sight detection.

According to the present disclosure, the error determination of the line-of-sight detection can be performed at high accuracy.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-210018, filed on Dec. 18, 2020, which is hereby incorporated by reference herein in its entirety.

What is claimed is:

1. A gaze detection apparatus comprising at least one memory and at least one processor which function as:
   a detection unit configured to detect a gaze of an eye that views a display surface, based on an eye image obtained by capturing the eye; and
   a determination unit configured to determine whether the detection of the gaze is in error, based on at least one of
   (1) a difference between an interval of a plurality of corneal reflex images detected from a current eye image and an interval of a plurality of corneal reflex images detected from a past eye image, and
   (2) a difference between
      a distance from a position representing the plurality of corneal reflex images detected from the current eye image to a position of a pupil image detected from the current eye image and
      a distance from a position representing the plurality of corneal reflex images detected from the past eye image to a position of a pupil image detected from the past eye image,
   wherein the at least one processor controls whether the detection result of the detection unit based on the current eye image is used for subsequent control based on the determination by the determination unit.

2. The gaze detection apparatus according to claim 1, wherein
   the detection unit detects the gaze by detecting the plurality of corneal reflex images from the eye image.

3. The gaze detection apparatus according to claim 1 wherein
   the determination unit determines that the detection of the gaze is in error in a case where the difference between the interval of the plurality of corneal reflex images detected from the current eye image and the interval of the plurality of corneal reflex images detected from the past eye image is larger than a threshold.

4. The gaze detection apparatus according to claim 1 wherein
   the detection unit detects the gaze by further detecting a pupil image from the eye image, and
   the determination unit determines that the detection of the gaze is in error in a case where a difference between:
      the distance from the position representing the plurality of corneal reflex images detected from the current eye image to the position of the pupil image detected from the current eye image and
      the distance from the position representing the plurality of corneal reflex images detected from the past eye image to the position from the pupil image detected in the past eye image,
   is larger than a threshold.

5. The gaze detection apparatus according to claim 1, wherein
   the determination unit uses, as the past eye image, an eye image which satisfies at least a condition in which a number of the plurality of detected corneal reflex images is substantially same as a number of the plurality of detected corneal reflex images in the current eye image.

6. The gaze detection apparatus according to claim 5, wherein
   the determination unit uses, as the past eye image, an eye image which further satisfies a condition in which an arrangement of the plurality of detected corneal reflex images is substantially same as an arrangement of the plurality of detected corneal reflex images in the current eye image.

7. The gaze detection apparatus according to claim 1, wherein
   the current eye image is an eye image obtained by capturing in a state where an index to be viewed by the eye is displayed on the display surface, and
   the determination unit uses, as the past eye image, an eye image which satisfies at least a condition in which the eye image is obtained by capturing in a state where a display position of the index is same as a display position of the index corresponding to the current eye image.

8. The gaze detection apparatus according to claim 7, wherein
   the index is an index for calibration operation to acquire parameters to be used for detection of the gaze.

9. The gaze detection apparatus according to claim 1, wherein the at least one processor further controls to:
   determine that the detection of the gaze is not in error in a case that the interval of a plurality of corneal reflex images detected from eye images over time remains approximately constant.

10. The gaze detection apparatus according to claim 1, wherein the determination unit determines whether the detection of the gaze is in error, based on the difference between the interval of the plurality of corneal reflex images detected from the current eye image and the interval of the plurality of corneal reflex images detected from the past eye image.

11. The gaze detection apparatus according to claim 10, wherein
   the subsequent control is a calibration control for acquiring a line-of-sight correction parameter, and
   in a case where the determination unit determines that the detection of the gaze is in error, the at least one processor does not use the detection result of the detection unit based on the current eye image to acquire the line-of-sight correction parameter.

12. The gaze detection apparatus according to claim 1, wherein the determination unit determines whether the detection of the gaze is in error, based on the difference between the distance from the position representing the plurality of corneal reflex images detected from the current eye image to the position of the pupil image detected from the current eye image and the distance from the position representing the plurality of corneal reflex images detected from the past eye image to the position of the pupil image detected from the past eye image.

13. The gaze detection apparatus according to claim 1, wherein the subsequent control is a calibration control for acquiring a line-of-sight correction parameter, and in a case where the determination unit determines that the detection of the gaze is in error, the at least one processor does not use the detection result of the detection unit based on the current eye image to acquire the line-of-sight correction parameter.

14. The gaze detection apparatus according to claim 13, wherein the at least one processor further controls to:

notify a user that a calibration failed, in a case where the determination unit determines that the detection of the gaze is in error.

15. The gaze detection apparatus according to claim 1, wherein the subsequent control is displaying a position of the gaze of the eye.

16. The gaze detection apparatus according to claim 15, wherein the at least one processor further controls to:

acquire a detection result of a current gaze position based on a detection result of a past gaze position, in a case where the determination unit determines that the detection of the gaze is in error.

17. The gaze detection apparatus according to claim 1, wherein the at least one processor further controls to:

acquire a detection result of a current gaze position based on a detection result of a past gaze position, in a case where the determination unit determines that the detection of the gaze is in error.

18. A gaze detection method comprising:

detecting a gaze of an eye that views a display surface, based on an eye image obtained by capturing the eye;

determining whether the detection of the gaze is in error, based on at least one of (1) a difference between an interval of a plurality of corneal reflex images detected from a current eye image and an interval of a plurality of corneal reflex images detected from a past eye image, and (2) a difference between a distance from a position representing the plurality of corneal reflex images detected from the current eye image to a position of a pupil image detected from the current eye image and a distance from a position representing the plurality of corneal reflex images detected from the past eye image to a position of a pupil image detected from the past ey image; and controlling whether the detection result of the detecting based on the current eye image is used for subsequent control, based on the determination.

19. A non-transitory computer readable medium that stores a program, wherein the program causes a computer to execute a gaze detection method comprising:

detecting a gaze of an eye that views a display surface, based on an eye image obtained by capturing the eye; and determining whether the detection of the gaze is in error, based on at least one of (1) a difference between an interval of a plurality of corneal reflex images detected from a current eye image and an interval of a plurality of corneal reflex images detected from a past eye image, and (2) a difference between a distance from a position representing the plurality of corneal reflex images detected from the current eye image to a position of a pupil image detected from the current eye image and a distance from a position representing the plurality of corneal reflex images detected from the past eye image to a position of a pupil image detected from the past eye image; and controlling whether the detection result of the detecting based on the current eye image is used for subsequent control, based on the determination.

\* \* \* \* \*